(12) United States Patent
Sato et al.

(10) Patent No.: US 12,716,824 B2
(45) Date of Patent: Aug. 25, 2026

(54) METHOD FOR EVALUATING TEXTURE UPON SWALLOWING FOODS OR DRINKS AND METHOD FOR PRODUCING FORMULATION FOR IMPROVING SWALLOWING TEXTURE

(71) Applicant: SAN-EI GEN F.F.I., INC., Toyonaka (JP)

(72) Inventors: Hiroyuki Sato, Toyonaka (JP); Nanae Kimura, Toyonaka (JP); Makoto Nakauma, Toyonaka (JP)

(73) Assignee: SAN-EI GEN F.F.I., INC., Toyonaka (JP)

( * ) Notice: Subject to any disclaimer, the term of this patent is extended or adjusted under 35 U.S.C. 154(b) by 298 days.

(21) Appl. No.: 18/550,127

(22) PCT Filed: Mar. 11, 2022

(86) PCT No.: PCT/JP2022/010768

§ 371 (c)(1),
(2) Date: Sep. 11, 2023

(87) PCT Pub. No.: WO2022/191304

PCT Pub. Date: Sep. 15, 2022

(65) Prior Publication Data

US 2024/0219281 A1 Jul. 4, 2024

(30) Foreign Application Priority Data

Mar. 12, 2021 (JP) ................................ 2021-040748

(51) Int. Cl.
*G01N 11/04* (2006.01)
*G01N 19/02* (2006.01)

(52) U.S. Cl.
CPC ............ *G01N 11/04* (2013.01); *G01N 19/02* (2013.01); *G01N 2203/0092* (2013.01)

(58) Field of Classification Search
CPC ........ G01N 11/04; G01N 11/06; G01N 11/08; G01N 19/02; G01N 2203/0092; G01N 2203/0094
See application file for complete search history.

(56) References Cited

U.S. PATENT DOCUMENTS

2009/0030346 A1 1/2009 Kojima et al.

FOREIGN PATENT DOCUMENTS

JP 2006-095264 A 4/2006
JP 4011071 B 11/2007

(Continued)

OTHER PUBLICATIONS

Martin-Alfonso, J.E. et al. “Relation between concentration and shear-extensional rheology properties of xanthan and guar gum solutions” Carbohydrate Polymers, vol. 181, 2018, pp. 63-70. (Year: 2018).*

(Continued)

*Primary Examiner* — Paul M. West
(74) *Attorney, Agent, or Firm* — Knobbe, Martens, Olson & Bear, LLP

(57) ABSTRACT

A method for evaluating texture upon swallowing foods or drinks includes adjusting viscosity of the food or drink to a constant or substantially constant shear viscosity by diluting the food or drink or adding a thickening component thereto, measuring a filament diameter of the viscosity-adjusted food or drink over time using a capillary breakup extensional viscometer to calculate an extensional viscosity and an extensional strain from a change in the filament diameter, determining an index value representing the extensional viscosity in a region where the extensional strain is in a specific range, and evaluating the quality of the texture upon swallowing the food or drink from the determined index value.

3 Claims, 6 Drawing Sheets

(56) References Cited

FOREIGN PATENT DOCUMENTS

| | | | |
|---|---|---|---|
| JP | 2009-039516 | A | 2/2009 |
| JP | 4400981 | B | 1/2010 |
| JP | 5489846 | B | 5/2014 |
| JP | 2016-526028 | A | 9/2016 |
| JP | 6133217 | B | 4/2017 |
| JP | 2019-219185 | A | 12/2019 |
| JP | 6687320 | B | 4/2020 |
| WO | WO 2012/117065 | A1 | 9/2012 |
| WO | WO 2013/087918 | A1 | 6/2013 |
| WO | WO 2014/184329 | A1 | 11/2014 |

OTHER PUBLICATIONS

Hadde, E.K. et al. "Shear and extensional rheological characterization of thickened fluid for dysphagia management" Journal of Food Engineering, vol. 245, 2019, pp. 18-23 (Year: 2019).*
Yuan, Bo et al. "Extensional and shear rheology of okra polysaccharides in the presence of artificial saliva" NPJ Sci Food. Nov. 20, 2018;2:20. (Year: 2018).*
Vieira, J.M. et al. "Rheology and soft tribology of thickened dispersions aiming the development of oropharyngeal dysphagia-oriented products" Curr Res Food Sci. Feb. 14, 2020;3:19-29. (Year: 2020).*
Marconati et al., The role of extensional rheology in the oral phase of swallowing: an in vitro study, arxiv.org, XP081583433, arXiv:2001.07810v1, 2020, in 17 pages.
Extended European Search Report dated Mar. 10, 2025 in European Patent Application No. 22767258.1, in 9 pages.
Appendix for Handling of the Indication Approvals for the Foods for the Elderly: Method of Testing Foods for the Elderly (Notification from Director of Office of Health Policy on Newly Developed Foods, Life Sanitation Bureau, Ministry of Health, Labour and Welfare, Feb. 23, 1994, Notice No. 15).
Bourne, M.C. (M. C. Bourne ed.), "Food Texture and Viscosity: Concept and Measurement", 2nd ed., Academic Press, 2002, pp. 182-186.
Kosaka, Kohei., "Measurement Principle and Theoretical Background of the Capillary Breakup Extensional Rheometer and its Applications", Journal of the Japan Society of Colour Material, vol. 90, No. 8, 2017, pp. 275-281.
Maruyama et al., "Simple and Objective Evaluation of the Rheological Properties of Liquid Food," Journal of Home Economics of Japan 57, No. 5, 2006, pp. 263-270.
International Search Report mailed May 31, 2022 of International Application No. PCT/JP2022/010768 in 3 pages.
Office Action issued in Malaysian Application No. PI2023005417, dated Nov. 18, 2025.
Office Action issued in Japanese Application No. 2023-505648, dated Feb. 3, 2026.
Office Action issued in Chinese Application No. 202280034537.2, dated Apr. 4, 2026.
Office Action issued in Vietnamese Application No. 1-2023-07080, dated Feb. 11, 2026.

* cited by examiner

FIG.2
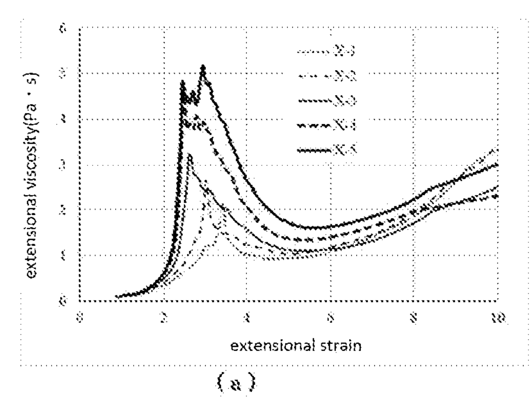
(a)
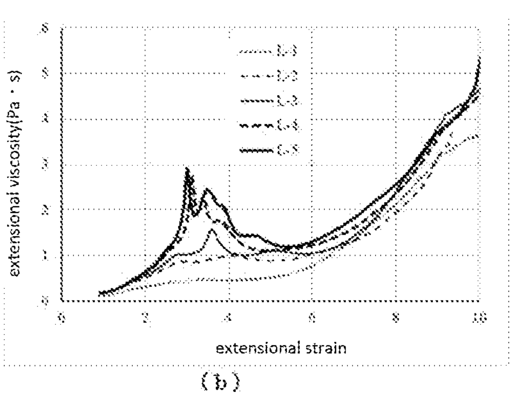
(b)

METHOD FOR EVALUATING TEXTURE UPON SWALLOWING FOODS OR DRINKS AND METHOD FOR PRODUCING FORMULATION FOR IMPROVING SWALLOWING TEXTURE

PRIORITY AND CROSS REFERENCE TO RELATED APPLICATIONS

This application is the U.S. National Stage Application under 35 U.S.C. § 371 of International Application No. PCT/JP2022/010768, filed Mar. 11, 2022, designating the U.S. and published as WO 2022/191304 A1 on Sep. 15, 2022, which claims the benefit of Japanese Patent Application No. JP 2021-040748, filed Mar. 12, 2021. Any and all applications for which a foreign or a domestic priority is claimed is/are identified in the Application Data Sheet filed herewith and is/are hereby incorporated by reference in their entirety under 37 C.F.R. § 1.57.

TECHNICAL FIELD

The present invention relates to a method for evaluating a swallowing texture of a food or drink, in which the texture upon swallowing a food or drink is evaluated based on results of a physical test, a method for producing a formulation for improving a swallowing texture using the evaluation method, and a formulation for improving a swallowing texture.

BACKGROUND ART

In recent years, with the increase in the number of elderly people, there has been a trend toward an increase in the number of people having difficulty in chewing and swallowing, who have dysfunction in the series of actions involved in chewing and swallowing food. Along with this, various formulations have been developed to improve bolus forming properties by increasing viscosity (imparting "Toromi") to a liquid food so that those having difficulty in chewing and swallowing can easily eat it, which are collectively referred to as "thickener for toromi-optimized foods". In recent years, thickening agents based on thickening polysaccharides are preferably used for thickener for toromi-optimized foods in view of their palatability and functionality.

Requirements for the thickener for toromi-optimized foods include properties mainly related to viscosity increase, such as good dispersibility, rapid increase of viscosity, and stability of viscosity (stable viscosity with respect to changes in time course, solvent type, temperature, and pH) when added to liquid foods under mild stirring conditions, for example, by hand stirring, and it is also important that the food has good taste, smell, color (transparency), and texture. In particular, bolus forming properties (cohesiveness), residual sensation in the oral cavity or pharynx (feeling of getting tangled in the throat or spinnability), and slipperines (sliminess) are important factors not only for palatability but also for safety swallowing.

Food polysaccharides such as xanthan gum, guar gum, modified starch, and carrageenan, which are relatively easy dispersed at room temperature (20 to 25° C.), have been used as the main agents for the viscosity development of the thickener for toromi-optimized foods. Although these polysaccharides are excellent as thickening agents for those having difficulty in chewing and swallowing from the viewpoint of increase of viscosity in a short time, the sliminess and residual sensation peculiar to the polysaccharides are generated. A food or drink for those having difficulty in chewing and swallowing prepared by using such polysaccharides is likely to remain in the pharynx, has insufficient shape retainability in some cases, and thus has a problem of poor arrangement in a bolus and difficulty in swallowing.

Conventionally, the indicator of the ease of easy to swallow of liquid foods is "viscosity". For example, according to the standard defined by the Ministry of Health, Labor and Welfare, liquid (sol) foods for those having difficulty in chewing and swallowing are defined as foods having a viscosity (constant shear viscosity) measured with a B-type rotational viscometer of 1,500 mPa·s or more (measurement temperature: 20±2° C.) (Non Patent Literature 1). However, the above-mentioned residue of a food or drink in the pharynx is rather a problem that tends to occur when the viscosity becomes too high. Since the viscosity does not correlate with the bolus in most cases, in recent years, there has been a widespread accepted that viscosity alone is not an objective measure of "ease of swallowing".

A ring method and a texture profile analysis (TPA) method of measuring "aggregation" are conventionally used as methods for judging the "cohesiveness" of a liquid food. In the ring method, a glass ring placed at the center of concentric circles carved at regular intervals is filled with liquid food, and the spread of the liquid food over a certain period of time after the ring is removed is used to judge the "cohesiveness" (Non Patent Literature 2). In the TPA method of measuring "aggregation", the "aggregation" of food is obtained from a compression energy ratio between the first compression and the second compression when the food is compressed twice in a vertical direction (Non Patent Literature 3).

Foods with high "cohesiveness" that are easily swallowed by those having difficulty in swallowing are expected to have different biological behaviors when swallowed, compared to foods that are difficult to swallow. In relation to the action of swallowing foods, attempts have been made to measure actual swallowing movement using various measuring devices for the purpose of evaluating the characteristics of foods and the capacity of human swallowing movement, and a method has already been reported to distinguish parameters such as "ease of swallowing", "difficulty in swallowing", "ease of eating", and "difficulty in eating" including "feeling of going down the throat", "feeling of being stuck in the throat", "feeling of satisfaction with the drink", "feeling of satisfaction with the food", "ease of swallowing", "light finish sensation in the throat", and "refreshing sensation in the throat" from signal waveforms of continuous swallowing behavior collected with an electric potential measuring device and a pressure sensor (Patent Literatures 1 and 2). There is also a method of determining whether a food is suitable for those having difficulty in swallowing by measuring the flow velocity of the food flowing in the throat using X-ray contrast imaging, endoscopic observation, or an ultrasonic measurement device (Patent Literature 3).

Furthermore, there are known methods of evaluating "cohesiveness" and "ease of swallowing" by attaching which a sound collecting microphone and a vibration detector to the throat of a subject to capture the sound when the subject swallows food, i.e., "swallowing sound", and analyzing its waveform (Patent Literature 4) and of evaluating the sensation of swallowing food or drink by attaching a laryngeal flexion sensor that converts the rate of flexion into electrical resistance to the larynx of the subject and measuring the electrical signal of the laryngeal flexion sensor generated when the subject swallows food or drink (during swallowing) to use the resulting two-dimensional signal waveform or parameters obtained from the waveform as an indicator (Patent Literature 5).

In addition, known are a method of improving the gumminess of a food or drink based on its extensional viscosity (Patent Literature 6) and a method of improving deglutition of a food or drink based on its relaxation time measured with a capillary breakup extensional viscometer (Patent Literature 7). Note that the Patent Literatures 6 and 7 do not describe any specific measurement results of extensional viscosity.

CITATION LIST

Patent Literature

Patent Literature 1: Japanese Patent Laid-Open No. 2006-95264

Patent Literature 2: Japanese Patent Laid-Open No. 2009-39516

Patent Literature 3: Japanese Patent No. 4400981

Patent Literature 4: Japanese Patent No. 4011071

Patent Literature 5: Japanese Patent No. 5489846

Patent Literature 6: Japanese Patent No. 6133217

Patent Literature 7: Japanese Patent No. 6687320

Non Patent Literature

Non Patent Literature 1: Appendix for Handling of the Indication Approvals for the Foods for the Elderly: Method of Testing Foods for the Elderly (Notification from Director of Office of Health Policy on Newly Developed Foods, Life Sanitation Bureau, Ministry of Health, Labour and Welfare, Feb. 23, 1994, Notice No. 15)

Non Patent Literature 2: Akiko MARUYAMA, et. al., "Simple and Objective Evaluation of the Rheological Properties of Liquid Food," Journal of Home Economics of Japan 57, no. 5 (2006): 263-270.

Non Patent Literature 3: Bourne, M. C. (M. C. Bourne ed.), Food Texture and Viscosity: Concept and Measurement 2nd ed., Academic Press, pp. 182-186 (2002).

SUMMARY OF INVENTION

Technical Problem

However, the ring method for judging "cohesiveness" has a disadvantage that the less spreading after a certain time is judged to be more "cohesive," while the discrimination ability is generally low, especially for liquid foods with strong stickiness, and even those that are judged "not cohesive" by sensory evaluation are often judged to have strong "cohesiveness" In the TPA method, "aggregation" of a food is considered to correlate with "cohesiveness", so this method is sometimes used as an indicator of "cohesiveness" of gelatinous or paste-like foods. Meanwhile, it often fails to correlate with "cohesiveness" of liquid foods.

As described in Patent Literatures 1 to 3, the method of measuring actual swallowing movements using various measuring devices has problems such that the devices themselves are complex and expensive, and their determination methods require special techniques.

Although methods of analyzing a waveform by capturing "swallowing sounds" and measuring the electrical signal of a laryngeal flexion sensor, as described in Patent Literatures 4 and 5, enable evaluation using a relatively inexpensive general-purpose device, they have drawbacks such as requiring several subjects to evaluate the results.

Since the methods described in Patent Literatures 6 and 7 do not consider the effect of extensional strain on extensional viscosity, it is not certain whether the effect of thickening polysaccharides or the like on improving swallowing characteristics can be clearly evaluated. Furthermore, since the test results are not clearly stated in the specification, the improvement effect is not clear.

The tendency of thickener for toromi-optimized foods to remain in the pharynx due to spinnability is generally evaluated by medical methods such as swallowing videofluorography and videoendoscopic examination of swallowing, but these methods require skilled evaluators with medical knowledge and qualifications and impose a heavy burden on the subjects. Thus, they cannot be used frequently for evaluating thickener for toromi-optimized foods. In addition, there is no method that can accurately measure the human sensation of sliminess in food or drink.

As described above, there are few methods suitable for objectively measuring the "cohesiveness", "spinnability", "sliminess", and the like, which are important textures upon swallowing a food or drink, and there is a strong demand for the establishment of measurement methods and techniques.

Accordingly, an object of the present invention is to provide a method for evaluating a texture upon swallowing a food or drink, in which the texture upon swallowing a food or drink can be accurately evaluated by a simple method using an extensional viscometer or the like. Another object is to provide a method for producing a formulation for improving a swallowing texture by which a formulation can be efficiently selected by using this evaluation method. A further object thereof is to provide a formulation for improving a swallowing texture that is highly effective in improving the texture upon swallowing while satisfying all criteria for selection in the production method.

Solution to Problem

The present inventors have found that determining an index value representing extensional viscosity from the extensional viscosity and extensional strain calculated using a capillary breakup extensional viscometer results in a high correlation between the index value and texture upon swallowing and have thus completed the present invention based on such a finding.

The present invention includes aspects described below.

Item 1.

A method for evaluating a texture upon swallowing foods or drinks, including:

- adjusting viscosity of a food or drink to a constant or substantially constant shear viscosity by diluting the food or drink or adding a thickening component thereto;
- measuring a filament diameter of the viscosity-adjusted food or drink over time using a capillary breakup extensional viscometer to calculate an extensional viscosity and an extensional strain from a change in the filament diameter;
- determining an index value representing the extensional viscosity in a region where the extensional strain is in a specific range; and
- evaluating the quality of the texture upon swallowing the food or drink from the determined index value.

Item 2.

The method for evaluating a texture upon swallowing according to item 1, in which the specific range of the extensional strain for determining the index value is determined by a correlation between a sensory evaluation of a texture upon swallowing obtained in advance and the extensional viscosity at the extensional strain.

Item 3.

The method for evaluating a texture upon swallowing foods or drinks according to item 1, in which determining the index value involves determination of a maximum extensional viscosity in a region where the extensional strain is 2 to 4 as the index value, and the texture to be evaluated upon swallowing is "cohesiveness".

Item 4.

The method for evaluating a texture upon swallowing foods or drinks according to item 1, in which determining the index value involves determination of an extensional viscosity at any extensional strain in a region where the extensional strain is 7 or more as the index value, and the texture to be evaluated upon swallowing is "spinnability".

Item 5.

The method for evaluating a texture upon swallowing foods or drinks according to item 1, in which determining the index value involves determination of a maximum extensional viscosity in a region where the extensional strain is 2 to 4 as the index value of "cohesiveness" as well as determination of an extensional viscosity at any extensional strain in a region where the extensional strain is 7 or more as the index value of "spinnability", and the texture to be evaluated upon swallowing is "cohesiveness" and "spinnability".

Item 6.

The method for evaluating a texture upon swallowing foods or drinks according to any one of items 1 to 5, further including evaluating "sliminess" of the food or drink from frictional properties in a tribological test based on a correlation between the frictional properties in the tribological test and a sensory evaluation obtained in advance.

Item 7.

The method for evaluating a texture upon swallowing foods or drinks according to item 6, in which the tribological test is to measure a coefficient of friction at a specific sliding speed when a rotating body is rotated in a state where a pressing force is applied while the food or drink in a container is interposed between the rotating body and a receiving portion.

Item 8.

A method for producing a formulation for improving a swallowing texture, including:

- performing the method for evaluating a texture upon swallowing a food or drink according to any one of items 1 to 7 using a liquid sample of a candidate formulation as the food or drink; and
- selecting a formulation by determining the texture upon swallowing the candidate formulation based on one or more evaluation results obtained of "cohesiveness", "spinnability", or "sliminess".

Item 9.

The method for producing a formulation for improving a swallowing texture according to items 8, in which

- the liquid sample of the candidate formulation is a dispersion of the candidate formulation dispersed in ion-exchanged water and adjusted to a shear viscosity of 50 to 150 mPa·s at a shear rate of 50 $s^{-1}$ at 25° C., and
- selecting the formulation involves selection of a formulation that satisfies all three criteria of having a maximum extensional viscosity of 2,000 mPa·s or more in a region where the extensional strain is 2 to 4, an extensional viscosity of 2,000 mPa·s or less at the extensional strain of 8, and a coefficient of friction of 0.22 or more at a sliding speed of 0.006 m/s, as a formulation highly effective in improving the "cohesiveness", the "spinnability", and the "sliminess".

Item 10.

The method for producing a formulation for improving a swallowing texture according to item 8, in which

- the liquid sample of the candidate formulation is a dispersion of the candidate formulation dispersed in ion-exchanged water and adjusted to a shear viscosity of 150 to 300 mPa·s at a shear rate of 50 $s^{-1}$ at 25° C., and
- selecting the formulation involves selection of a formulation that satisfies all three criteria of having a maximum extensional viscosity of 5,000 mPa·s or more in a region where the extensional strain is 2 to 4, an extensional viscosity of 2,500 mPa·s or less at the extensional strain of 8, and a coefficient of friction 0.20 or more at a sliding speed of 0.006 m/s, as a formulation highly effective in improving the "cohesiveness", the "spinnability", and the "sliminess".

Item 11.

The method for producing a formulation for improving a swallowing texture according to item 8, in which

- the liquid sample of the candidate formulation is a dispersion of the candidate formulation dispersed in ion-exchanged water and adjusted to a shear viscosity of 300 to 500 mPa·s at a shear rate of 50 $s^{-1}$ at 25° C., and
- selecting the formulation involves selection of a formulation that satisfies all three criteria of having a maximum extensional viscosity of 8,000 mPa·s or more in a region where the extensional strain is 2 to 4, an extensional viscosity of 3,000 mPa·s or less at the extensional strain of 8, and a coefficient of friction 0.18 or more at a sliding speed of 0.006 m/s, as a formulation highly effective in improving the "cohesiveness", the "spinnability", and the "sliminess".

Item 12.

A formulation for improving a swallowing texture comprising a thickening polysaccharide, the formulation satisfying all of the criteria for selection in the method for producing a formulation for improving a swallowing texture according to any one of items 9 to 11.

Advantageous Effects of Invention

According to the method for evaluating a texture upon swallowing foods or drinks, determining an index value representing the extensional viscosity in the region where the extensional strain is in a specific range from the extensional viscosity and extensional strain calculated using a capillary breakup extensional viscometer may enhance the correlation between the texture upon swallowing a food or drink and the index value, thereby enabling accurate evaluation of the texture upon swallowing. As a result, the present invention can provide a method for evaluating a texture upon swallowing foods or drinks, in which the texture upon swallowing foods or drinks can be accurately evaluated by a simple method using an extensional viscometer or the like.

According to the method for producing a formulation for improving a swallowing texture, the evaluation method of the present invention is carried out using a liquid sample of a candidate formulation to select a formulation by determining the texture upon swallowing the candidate formulation, and therefore, it is possible to provide a method for producing a formulation for improving a swallowing texture by which a formulation highly efficiently in improving a swallowing texture can be efficiently selected.

According to the formulation for improving a swallowing texture of the present invention, it is possible to provide a formulation for improving a swallowing texture that is highly effective in improving the texture upon swallowing by satisfying all the criteria for selection in the production method of the present invention.

BRIEF DESCRIPTION OF DRAWINGS

FIG. 2 is a graph showing extensional strain dependence of extensional viscosity in Example 1. FIG. 2(*a*) is a graph for xanthan gum, and FIG. 2(*b*) is a graph for locust bean gum.

FIG. 3(*a*) is a graph for xanthan gum, and FIG. 3(*b*) is a graph for locust bean gum.

Figure 1A:
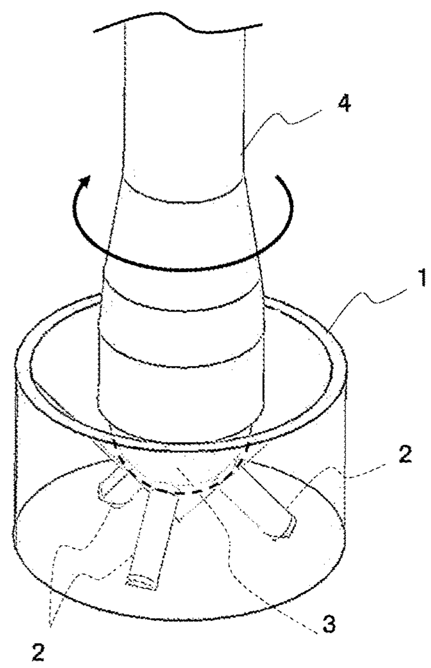
FIG. 1A is a perspective view schematically showing a tribology measuring equipment (set-up) used in Examples.

DESCRIPTION OF EMBODIMENTS (Object to be Evaluated)

The present invention relates to a method for evaluating a texture upon swallowing foods or drinks, and examples of the texture upon swallowing that can be evaluated include "cohesiveness", "spinnability", "sliminess", "residual sensation", "stickiness", "gumminess", and "mouthcoating", all of which are major textures upon swallowing a food or drink. In particular, the texture is preferably one or more of the evaluation items consisting of "cohesiveness", "spinnability", and "sliminess".

In the present invention, when evaluating a food or drink, it is also possible to evaluate a food or drink to which components that affect easy to swallow, such as a thickener, a dispersant, an emulsifier, and a stabilizer, have been added. The evaluation method of the present invention is also effective as a method for evaluating the texture upon swallowing foods or drinks containing thickening components such as thickening polysaccharides. This method is also effective for evaluating the texture upon swallowing a liquid sample of a candidate formulation in order to select an effective formulation from the candidate formulations for improving a swallowing texture.

The food or drink include Food and Drink (Foods and Drinks), which are taken orally with or without chewing, and a thickening component is a component having an effect of increasing viscosity and refers to s thickener, an additive which is added to a food or drink and imparting viscosity, and a viscous component contained in a food or drink.

The food or drink is not particularly limited, and examples thereof include those described below, but nursing foods such as thickener for toromi-optimized foods are positioned as important foods because the development of the nursing foods such as thickener for toromi-optimized foods, which are prepared by thickening a liquid to slow the speed at which the liquid passes through the throat, for the purpose of reducing the risk of accidentally entering the trachea (i.e., aspiration) when swallowed, is urgently required due to the progress of aging society.

Such nursing foods includes not only foods to which a thickening component is added but also beverages other than foods, such as water, tea, and juice, to which a thickening component is added. The formulation for improving a swallowing texture also contains components that affect easy to swallow, such as a thickener, a dispersant, an emulsifier, and a stabilizer.

Examples of the main components of the thickener and dispersant to be evaluated include xanthan gum, welan gum, carrageenan, guar gum, enzymatically hydrolyzed guar gum, locust bean gum, alginic acid, alginate, glucomannan, starch, modified starch, modified starch, dextrin, tamarind seed gum, soybean polysaccharide, agar, tara gum, pectin, native gellan gum, deacylated gellan gum, cassia gum, psyllium seed gum, linseed gum, *Artemisia* seed gum, tragacanth gum, karaya gum, gum arabic, gum ghatti, rhamsan gum, macrohomopsis gum, curdlan, pullulan, succinoglycan, chitin, chitosan, mannan, gelatin, cellulose, microcrystalline cellulose, microfibrous cellulose, fermented cellulose, methylcellulose, hydroxypropyl cellulose, carboxymethyl cellulose, hydroxypropylmethyl cellulose, hydroxyethyl cellulose, water-soluble hemicellulose, plant fiber (e.g., citrus), and konjac flour or hydrolyzate thereof. When these components are used as thickeners or dispersants, they may be used alone or in combination of two or more.

Even if these are the same thickening components, the texture upon swallowing may change depending on manufacturing methods, raw materials, and purification methods. In addition, it is possible to evaluate a mixture or modified mixture of these components as appropriate. The evaluation method of the present invention enables an evaluation of the texture upon swallowing a newly developed thickener and an evaluation of the change in texture upon swallowing resulting from the interaction between the thickening components and other components.

Examples of the emulsifier and the stabilizer include glycerin fatty acid esters (e.g., monoglycerin fatty acid ester, diglycerin fatty acid ester, organic acid monoglyceride, polyglycerin fatty acid ester, polyglycerin fused ricinoleic acid ester), sucrose fatty acid esters, sorbitan fatty acid esters, propylene glycol fatty acid esters, calcium stearate, polysorbate, lecithin, and saponin.

(Target Food or Drink)

The type of the food or drink is not particularly limited, but specific examples of the food or drink include

- beverages such as water (including distilled water, ion-exchange water, pure water, reverse osmosis membrane-treated water, ultra-pure water), milk, milk drinks, probiotic drinks, fermented milk drinks, carbonated drinks, fruit drinks (e.g., fruit juice drink, soft drink with fruit juice, soft drink with fruit juice, pulp drink), vegetable drinks, vegetable and fruit drinks, coffee drinks, cocoa drinks, powder drinks, sports drinks, functional drinks, ionic drink, vitamin supplement drinks, nutritional supplement drinks, supplement drinks;

tea beverages such as black tea beverages, green tea, and blended tea (beverages and tea beverages are both included in "drink");

alcoholic beverages such as independent beverages including Japanese sake, beer, low-malt beer, beer-flavored alcoholic beverages, shochu (Japanese white liquor), whiskey, brandy, wine, spirits (rum, vodka, gin, tequila, etc.), liqueurs, and ethanol, various cocktails containing the aforementioned drinking alcohols, and fruit wine including red wine obtained by brewing fruit juice;

soups such as consommé soup, potage soup, cream soup, and Chinese soup;

liquid foods such as miso soup, clear soup, stew, curry, and gratin;

liquid seasonings such as separating dressing, non-oil dressing, ketchup, dipping sauce, soy sauce, and sauce;

special foods and therapeutic foods such as protein-phosphorus-potassium-adjusted foods, salt-adjusted foods, oil-adjusted foods, foods regulating the functions of the intestines, calcium-iron-vitamin-enriched foods, low-allergy foods, concentrated liquid foods, blender-processed food, and shredded foods.

Examples of the food and drink also include semi-finished products and intermediate products of these products.

<Adjusting Shear Viscosity of Food or Drink>

It is necessary to adjust the concentration of a liquid sample so that the liquid sample has an appropriate shear viscosity at a constant shear rate from the viewpoint of improving the accuracy of the evaluation of the texture upon swallowing. In other words, in the evaluation method of the present invention, the shear viscosity usually changes depending on the concentration of a solute or the like in the liquid sample, and the extensional viscosity can also change accordingly. Therefore, the texture upon swallowing is evaluated using a liquid sample adjusted to a constant or substantially constant shear viscosity.

The method for evaluating the texture upon swallowing of the present invention thus includes adjusting viscosity of a target food or drink to a constant or substantially constant shear viscosity by diluting the food or drink or adding a thickening component thereto.

As used herein, a predetermined shear viscosity is preferably 50 to 150 mPa·s, 150 to 300 mPa·s, or 300 to 500 mPa·s, more preferably 80 to 120 mPa·s, 160 to 240 mPa·s, or 320 to 480 mPa·s, and still more preferably 94 to 106 mPa·s, 192 to 208 mPa·s, or 385 to 415 mPa·s at a shear rate of 50 $s^{-1}$ at 25° C.

The shear viscosity of a food or drink can be adjusted by adding a liquid component (such as water) to the food or drink to dilute it or by adding a thickener to thickening the food or drink to thicken it. The thickener to be used preferably contain the above-mentioned "components of the thickener and dispersant to be evaluated".

When the target food, drink, or thickener is a solid, a liquid sample is prepared by dispersing or dissolving it in a solvent. "Lumps" refers to a state in which the powder or granular thickening component absorbs water before being uniformly dispersed in the solvent, only the surface of the powder or granular mass is hydrated, and water hardly permeates into the portion that is not yet in contact with water, thereby inhibiting uniform dispersion. When a solid food (solute) is dispersed, it is preferable that the "lumps" are not generated. Even when the solute is completely hydrated (dissolved), it is preferable that the solute is uniformly dissolved so as not to generate a concentration distribution. From the viewpoint of reducing the influence of components other than water, the solvent used is preferably water, and in particular, ion-exchange water, distilled water, reverse osmosis membrane treated water, pure water, ultra-pure water, and the like.

The method of measuring the shear viscosity is, for example, as described in Examples, but can be carried out using a generally used dynamic viscoelasticity measuring device.

When the shear viscosity of the target food or drink before adjustment is within a predetermined shear viscosity range, the procedure of viscosity adjustment can be omitted.

<Step of Calculating Extensional Viscosity and Extensional Strain>

The method for evaluating a texture upon swallowing of the present invention includes measuring a filament diameter of the viscosity-adjusted food or drink over time using a capillary breakup extensional viscometer to calculate an extensional viscosity and an extensional strain from a change in the filament diameter. The extensional viscosity and extensional strain of a food or drink can be calculated relatively easily and reproducibly by using the capillary breakup extensional viscometer.

In general, a capillary breakup extensional viscometer (CaBER) is exemplified as a device that has sample holders arranged vertically at intervals, expands the interval of the sample holders at a predetermined speed in a state in which the sample is arranged between the holders, and measures the behavior (e.g., filament diameter) when the sample is extended using observation means such as a laser beam.

In the extensional viscometer used in Examples, a sample is loaded between two plates having a diameter of 4 mm arranged parallel to each other in the vertical direction with an initial gap of 1 mm. Then, the upper plate is stretched linearly at 50 ms to achieve a final gap of 4.1 mm. The sample is drawn and extended by the plates and then flowed up and down by its own surface tension to form hemispherical droplets, contracting on a filament in the process. The sample between the plates thus contracts in the form of the filament. The diameter of the filament at the midpoint of the height of the final gap between the two upper and lower plates ($D_{mid}$) is measured using a laser beam continuously from the initial diameter $D_0$ (=4 mm) at time $t_0$ (when the top plate started to move) to the time $t_b$ (when the filament was broken) until the filament broke.

Although the measurement can be performed only once, it is preferable to repeat the measurement a plurality of times (e.g., five or more times) for each sample in order to increase the accuracy of the evaluation of the texture upon swallowing.

There are various model-specific methods for calculating extensional viscosity and extensional strain from changes in the diameter of the filament. For example, the extensional viscosity $\eta_E$ can be calculated using formula (1). In this model, the extensional viscosity $\eta_E$ of the sample is calculated from the contraction behavior of the filament after the upper plate reaches the final gap.

[Expression 1]

$$\eta_E = (2X-1)\frac{\sigma}{\frac{-dD_{mid}(t)}{dt}} \quad (1)$$

Here, $\sigma$ represents the surface tension of the sample, $D_{mid}^{(t)}$ represents the diameter of the filament at the midpoint of the height of the final gap at time t, and X represents a geometric coefficient that takes into account the shape of the filament during contraction due to inertial and gravitational effects. It has been experimentally shown that X=0.7127 is an appropriate value for highly viscous fluids.

The surface tension σ of the sample can be measured using various surface tension measuring devices, and the measurement is preferably repeated a plurality of times at the same measurement temperature as that of the measurement by the elongation viscometer, and the average thereof is taken as the surface tension σ.

A differential approximation of the diameter of the filament at the midpoint can be used in calculating the extensional viscosity $\eta_E$ in formula (1), and the differential approximation can be calculated, for example, from formula (2).

[Expression 2]

$$\frac{dD_{mid}(t)}{dt} = \frac{D_{mid}(t_i) - D_{mid}(t_{i-1})}{t_i - t_{i-1}} \tag{2}$$

Here, $t_i$ represents a measurement point (time) closest to any time t, and $t_{i-1}$ represents a measurement point one before $t_i$. $D_{mid}$ ($t_i$) and $D_{mid}$ ($t_{i-1}$) represents filament diameters at the respective measurement points. Hence, the extensional viscosity $\eta_E$ at time t can be calculated.

Moreover, the extensional strain ε (Hencky strain) can be calculated from formula (3).

[Expression 3]

$$\varepsilon = 2\ln\left(\frac{D_0}{D_{mid}(t)}\right) \tag{3}$$

Hence, the extensional strain ε at time t can be calculated, and the relationship between the extensional strain ε and the extensional viscosity $\eta_E$ can be calculated via the time t.

As described above, the extensional viscosity and the extensional strain can be calculated from the change in the diameter of the filament measured with time using the extensional viscometer.

<Step of Determining Index Value>

The method for evaluating a texture upon swallowing of the present invention includes determining an index value representing the extensional viscosity in a region where the extensional strain is in a specific range. Determining an index value representing the extensional viscosity in a region where the extensional strain is in a specific range may enhance the correlation between the texture upon swallowing a food or drink and the index value. In other words, the texture upon swallowing is related to a part of the extensional behavior when measured by a capillary breakup extensional viscometer, and it is important to determine an index value representing the extensional viscosity in that region by limiting the extensional strain related to the part of the behavior to a specific range.

In the case where the texture upon swallowing to be evaluated is "cohesiveness", for example, it is possible to determine an index value representing the extensional viscosity in the region where the extensional strain is 1 to 5. However, it is preferable to determine an index value representing the extensional viscosity in the region where the extensional strain is 2 to 4. Although a representative index value can be determined using an extensional viscosity of 1 or more in these regions, it is more preferable to determine the maximum extensional viscosity as the index value.

When there are a plurality of maximum values (values serving as peaks) of the extensional viscosity in the above-mentioned region of the extensional strain, instead of the maximum extensional viscosity, the maximum value of the extensional viscosity on the side of the smallest extensional strain may be determined as the index value, or the average of a plurality of maximum values may be determined as the index value.

In the case where the texture upon swallowing evaluated is "spinnability", it is possible to determine an index value representing the extensional viscosity in the region where the extensional strain is 7 or more. However, it is preferable to determine an index value representing the extensional viscosity in the region where the extensional strain is 7.5 or more and 10 or less. Although a representative index value can be determined using an extensional viscosity of 1 or more in these regions, it is more preferable to determine an extensional viscosity at any extensional strain (e.g., extensional strain of 8) as the index value. When a representative index value is determined using an extensional viscosity of 2 or more, the average of a plurality of extensional viscosities or a weighted average obtained by weighting more important extensional viscosity (e.g., extensional viscosity when the extensional strain is 8) may be taken.

The method for evaluating a texture upon swallowing of the present invention enables an evaluation of a plurality of textures upon swallowing from results of calculating the extensional viscosity and the extensional strain, and for example, it is possible to determine of a maximum extensional viscosity in a region where the extensional strain is 2 to 4 as the index value of "cohesiveness" as well as an extensional viscosity at any extensional strain in a region where the extensional strain is 7 or more as the index value of "spinnability".

The extensional strain value (or the range thereof) for calculating the index value of the texture evaluation method upon swallowing of the present invention is preferably determined based on the correlation between a sensory evaluation of a texture upon swallowing obtained in advance and the index value. The evaluation method of the present invention is a method for predicting the result of sensory evaluation, and the method of sensory evaluation itself is not limited at all and may correspond to any sensory evaluation method as long as a significant difference is obtained by sensory evaluation.

The method of the sensory evaluation is preferably a method capable of quantifying evaluation results in detail, and a visual analog scale (VAS) method is preferably adopted. It is also preferable to have a sufficient number of subjects and to ensure that the oral sensation of all subjects has a certain level of accuracy.

The correlation can be obtained from the index value and the result of the sensory evaluation by performing the aforementioned step of calculating the extensional viscosity and the extensional strain and determining the index value with respect to a plurality of foods and drinks having different textures upon swallowing, as well as performing the sensory evaluation of the same foods and drinks. It is preferable that the conditions in each step to determine the correlation match the conditions for carrying out the method for evaluating the texture upon swallowing of the present invention.

In the case of evaluating a food or drink containing a thickening component, for example, a food or drink in which not only the concentration of the thickening component but also the type of the thickening component are changed can be used as a plurality of food or drink for obtaining the correlation to make the method for evaluating the texture upon swallowing more versatile.

The plurality of foods and drinks used to obtain the correlation are preferably two or more, and more preferably three or more, from the viewpoint of improving the accuracy of evaluating the texture upon swallowing the food or drink.

In the case of determining the correlation, a regression equation can be obtained based on exponential and logarithmic approximations in addition to linear approximation. In Example 1, for example, a linear approximation was made for the correlation between the maximum extensional viscosity at the extensional strain of 2 to 4 and the sensory evaluation value of "cohesiveness", and the following was obtained;

Correlation coefficient: $r=0.944$ ($p<0.05$)

This confirms that the maximum extensional viscosity at the extensional strain of 2 to 4 is a good indicator of "cohesiveness".

In Example 1, the linear approximation was also made for the correlation between the extensional viscosity at the extensional strain of 8 and the sensory evaluation value of "spinnability", and the following was obtained;

Correlation coefficient: $r=0.860$ ($p<0.05$)

This confirms that the extensional viscosity at the extensional strain of 8 is good indicator of "spinnability".

In the case of determining the extensional strain value (or its range) for calculating the index value of the texture evaluation method upon swallowing based on the correlation, it is preferable to adopt conditions in which the absolute value of the correlation coefficient between the index value (extensional viscosity value at a specific extensional strain or the like) and the sensory evaluation value is 0.8 or more. The absolute value of the correlation coefficient is more preferably 0.85 or more, and still more preferably 0.9 or more.

<Step of Evaluating Texture Upon Swallowing>

As described above, the texture is evaluated by using the index value obtained from the calculation method determined based on the correlation with the sensory evaluation value. In other words, the method for evaluating the texture of the present invention includes evaluating quality of a texture upon swallowing the food or drink from the determined index value.

In the case where the liquid sample of the candidate formulation is a dispersion in which the candidate formulation is dispersed in ion-exchange water and adjusted to a shear viscosity of 50 to 150 mPa·s at a shear rate of 50 $s^{-1}$ at 25° C., for example, the "cohesiveness" of all the foods or drinks to be evaluated is determined to be 50 or more, that is, the "cohesiveness" is good, by the VAS method described above when the maximum extensional viscosity is 2,000 mPa·s or more in the region where the extensional strain is 2 to 4. When the extensional viscosity is 2,000 mPa·s or less at the extensional strain of 8, the "spinnability" of all the foods or drinks to be evaluated is determined to be less than 50, that is, the "spinnability" is low, by the VAS method described above. As a result, it is determined that residual sensation in the throat is small.

<Step of Evaluating "Sliminess">

The method for evaluating a texture upon swallowing of the present invention may include evaluating "sliminess" of the food or drink from frictional properties in a tribological test based on a correlation between the frictional properties in the tribological test and the sensory evaluation obtained in advance. The tribological test is preferably to measure a coefficient of friction at a specific sliding speed when a rotating body is rotated in a state where a pressing force is applied while the food or drink in a container is interposed between the rotating body and a receiving portion. Specific examples thereof include tribological tests described in Examples.

The correlation is preferably determined by conducting a tribological test under a plurality of conditions and selecting a condition under which the coefficient of friction and the sensory evaluation are highly correlated. For example, the correlation can be determined by measuring the coefficient of friction as the sliding speed is varied and selecting a condition that highly correlate with the sensory evaluation of "sliminess". In particular, the correlation coefficient with the coefficient of friction at point e (i.e., 0.006 m/s), the transition point from a "boundary lubrication region" to a "mixed lubrication region", showed a high value, which is thus preferable as a condition for evaluating the "sliminess".

In the case of determining the correlation, a regression equation can be obtained based on exponential and logarithmic approximations in addition to linear approximation. In Example 1, for example, a linear approximation was made for the correlation between the coefficient of friction at a sliding speed of 0.006 m/s and the sensory evaluation value of "sliminess", and the following was obtained;

Correlation coefficient: $r=-0.895$ ($p<0.05$)

In the tribological test, the normal force (load) is preferably 0.1 to 1 N because the correlation between the obtained frictional properties and the "sliminess" is high in this case, more preferably 0.2 to 0.5 N, and most preferably 0.3 N.

In the present invention, it is preferable to adopt conditions of the tribological test in which the absolute value of the correlation coefficient is 0.8 or more. The absolute value of the correlation coefficient is more preferably 0.85 or more, and still more preferably 0.9 or more.

Furthermore, as described above, the texture is evaluated by using the index value obtained from the calculation method determined based on the correlation with the sensory evaluation value.

In the case where the liquid sample of the candidate formulation is a dispersion in which the candidate formulation is dispersed in ion-exchange water and adjusted to a shear viscosity of 50 to 150 mPa·s at a shear rate of 50 $s^{-1}$ at 25° C., for example, the "sliminess" of all the foods or drinks to be evaluated is determined to be less than 50, that is, the "sliminess" is small, by the VAS method described above when the coefficient of friction at a sliding speed of 0.006 m/s is 0.22 or more.

<Method for Producing Formulation for Improving Swallowing Texture>

The method for producing a formulation for improving a swallowing texture of the present invention includes performing the method for evaluating a texture upon swallowing a food or drink of the present invention as described above using a liquid sample of a candidate formulation as the food or drink; and selecting a formulation by determining the texture upon swallowing the candidate formulation based on one or more evaluation results obtained of "cohesiveness", "spinnability", or "sliminess".

In this case, it is preferable to satisfy at least one of the following criteria (a) to (c):

(a) The liquid sample of the candidate formulation is a dispersion of the candidate formulation dispersed in ion-exchanged water and adjusted to a shear viscosity of 94 to 106 mPa·s at a shear rate of 50 $s^{-1}$ at 25° C., and selecting the formulation involves selection of a formulation that satisfies all three criteria of having a maximum extensional viscosity of 2,000 mPa·s or more in a region where the extensional strain is 2 to 4, an extensional viscosity of 2,000 mPa·s or less at the extensional strain of 8, and a coefficient of friction of 0.22 or more at a sliding speed of 0.006 m/s, as a formulation highly effective in improving the "cohesiveness", the "spinnability", and the "sliminess";

(b) The liquid sample of the candidate formulation is a dispersion of the candidate formulation dispersed in ion-exchanged water and adjusted to a shear viscosity of 192 to 208 mPa·s at a shear rate of 50 $s^{-1}$ at 25° C., and selecting the formulation involves selection of a formulation that satisfies all three criteria of having a maximum extensional viscosity of 5,000 mPa·s or more in a region where the extensional strain is 2 to 4, an extensional viscosity of 2,500 mPa·s or less at the extensional strain of 8, and a coefficient of friction 0.20 or more at a sliding speed of 0.006 m/s, as a formulation highly effective in improving the "cohesiveness", the "spinnability", and the "sliminess"; and (c) The liquid sample of the candidate formulation is a dispersion of the candidate formulation dispersed in ion-exchanged water and adjusted to a shear viscosity of 385 to 415 mPa·s at a shear rate of 50 $s^{-1}$ at 25° C., and selecting the formulation involves selection of a formulation that satisfies all three criteria of having a maximum extensional viscosity of 8,000 mPa·s or more in a region where the extensional strain is 2 to 4, an extensional viscosity of 3,000 mPa·s or less at the extensional strain of 8, and a coefficient of friction of 0.18 or more at a sliding speed of 0.006 m/s, as a formulation highly effective in improving the "cohesiveness", the "spinnability", and the "sliminess".

<Formulation for Improving Swallowing Texture>

The formulation for improving a swallowing texture of the present invention contains a thickening polysaccharide and satisfies all of the criteria for selection in the method for producing a formulation for improving a swallowing texture.

Specifically, the formulation satisfies at least one of the following criteria (a) to (c):

(a) The dispersion of the candidate formulation dispersed in ion-exchanged water and adjusted to a shear viscosity of 50 to 150 mPa·s at a shear rate of 50 $s^{-1}$ at 25° C. satisfies all three criteria of having a maximum extensional viscosity of 2,000 mPa·s or more in a region where the extensional strain is 2 to 4, an extensional viscosity of 2,000 mPa·s or less at the extensional strain of 8, and a coefficient of friction of 0.22 or more at a sliding speed of 0.006 m/s;

(b) The dispersion of the candidate formulation dispersed in ion-exchanged water and adjusted to a shear viscosity of 150 to 300 mPa·s at a shear rate of 50 $s^{-1}$ at 25° C. satisfies all three criteria of having a maximum extensional viscosity of 5,000 mPa·s or more in a region where the extensional strain is 2 to 4, an extensional viscosity of 2,500 mPa·s or less at the extensional strain of 8, and a coefficient of friction of 0.20 or more at a sliding speed of 0.006 m/s; and (c) The dispersion of the candidate formulation dispersed in ion-exchanged water and adjusted to a shear viscosity of 400 to 500 mPa·s at a shear rate of 50 $s^{-1}$ at 25° C. satisfies all three criteria of having a maximum extensional viscosity of 8,000 mPa·s or more in a region where the extensional strain is 2 to 4, an extensional viscosity of 3,000 mPa·s or less at the extensional strain of 8, and a coefficient of friction of 0.18 or more at a sliding speed of 0.006 m/s.

The formulation for improving a swallowing texture may also contain components that affect easy to swallow, such as a thickener including a thickening polysaccharide, a dispersant, an emulsifier, and a stabilizer and specific examples include one or more of the aforementioned components.

The following methods can be used for adjustment to satisfy at least one of the above criteria (a) to (c):

(1) In the case of preferentially increasing the maximum extensional viscosity in the region where the extensional strain is 2 to 4, for example, a material having a higher potency than that of a normal product such as heat-treated xanthan gum or a higher acyl gellan gum is added, or the content thereof is increased;

(2) In the case of preferentially reducing the extensional viscosity at the extensional strain of 8, a material containing an insoluble dietary fiber such as citrus fiber or a polysaccharide having surface activity such as gum arabic, gum ghatti, soybean polysaccharide, and sugar beet pectin is added, or the content thereof is increased; and (3) In the case of preferentially increasing the coefficient of friction at a sliding speed of 0.006/s, gum arabic, soybean polysaccharide, and the like, which are less viscous than the amount added, are removed, or the content thereof is reduced.

Of course, it is also possible to satisfy at least one of the above criteria (a) to (c) through trial and error by appropriately mixing those satisfying each parameter.

INDUSTRIAL APPLICABILITY

The present invention can provide a simple, quick, and objective method for evaluating the "cohesiveness", "residual sensation", and "sliminess" in the throat, which can be important parameters for the "ease of swallowing" of foods and beverages, particularly fluid foods and beverages. The present invention can also provide a method for evaluating whether or not a fluid composition is an easily easy to swallow fluid composition suitable for an elderly person or a person having difficulty in swallowing by utilizing the above-described method. Furthermore, the present invention can provide a method of selecting an easily easy to swallow fluid composition suitable for an elderly person or a person with difficulty in swallowing from fluid compositions to be tested by utilizing the above-described method and the easily easy to swallow fluid composition selected by the method.

EXAMPLES

Hereinafter, the present invention is described with reference to Examples, but the scope of the present invention is not limited thereto. Note that the symbol "%" indicates "% by mass" unless otherwise specified.

Examples 1: Evaluation of Texture Upon Swallowing Thickening Polysaccharide (Polysaccharide Thickeners)

Food polysaccharides used were xanthan gum (XG), which is SAN SUPPORT® S-15 (San-Ei Gen F.F.I., Inc., Osaka, Japan) and locust bean gum (LBG), which is SAN SUPPORT® S-21 (San-Ei Gen F.F.I., Inc., Osaka, Japan).

(Preparation of Polysaccharide Solution)

A total of 10 polysaccharide solutions were used: XG dispersions with a concentration of 0.2%, 0.4%, 0.6%, 0.8%, or 1.0% and LBG solutions with a concentration of 0.3%, 0.4%, 0.45%, 0.5%, or 0.55%. In a glass beaker, 200 g of ion-exchange water was placed and heated to 80° C. 0.4 g, 0.8 g, 1.2 g, 1.6 g, or 2.0 g of XG or 0.6 g, 0.8 g, 0.9 g, 1.0 g, or 1.1 g of LBG was added thereto under stirring at 1,000 rpm using a four-bladed propeller having a diameter of 60 mm. After heating, stirring, and dissolving for 10 minutes, the weight of the dispersion was adjusted to 200 g by correcting evaporated water with ion-exchanged water. Then, the dispersion was cooled in a water tank at 20° C. to prepare XG dispersions with a polysaccharide concentrations of 0.2%, 0.4%, 0.6%, 0.8%, or 1.0% (hereinafter referred to as XG solutions; XG solutions with various concentrations were referred to as X-1, X-2, X-3, X-4, and X-5, respectively) or LBG dispersions with a polysaccharide concentration of 0.3%, 0.4%, 0.45%, 0.5%, or 0.55% (hereinafter referred to as LBG solutions; LBG solutions with various concentrations were referred to as L-1, L-2, L-3, L-4, and L-5, respectively). These polysaccharide solutions were stored overnight at 5° C. and used by adjusting the temperature to 25° C. in a thermostatic bath immediately before rheological measurement, tribological measurement, and sensory evaluation as described below.

(Shear Viscosity Measurement)

Steady flow shear viscosity and dynamic viscoelasticity of beverage samples at 25° C. were measured using a fluid rheometer ARES-LS1 (TA Instruments, DE, US). The steady flow shear viscosity was measured using a 50-mm-diameter resin cone-plate plunger with a gap of 0.05 mm when the strain rate was increased linearly from 0 to 50 $s^{-1}$ over one minute and stabilized at a constant rate for one minute after reaching 50 $s^{-1}$.

(Extensional Viscosity Measurement (CaBER1 Measurement))

The extensional rheology of the polysaccharide solutions was measured using an extensional viscometer CaBER1 (Thermo Haake GmbH, Karlsruhe, Germany) at 25° C. The principle of this method was as follows: A plastic pipette was used to load a sample between two plates having a diameter of 4 mm arranged parallel to each other in the vertical direction with an initial gap of 1 mm. Then, the upper plate was stretched linearly at 50 ms to achieve a final gap of 4.1 mm. The polysaccharide solutions were each drawn and extended by the plates and then flowed up and down by its own surface tension to form hemispherical droplets, contracting on a filament in the process. The solution between the plates thus contracts in the form of the filament. The diameter of the filament at the midpoint of the height of the final gap between the two upper and lower plates ($D_{mid}$) was measured using a laser beam continuously from the initial diameter $D_0$ (=4 mm) at time $t_0$ (when the top plate started to move) to the time $t_b$ (when the filament was broken) until the filament broke. The measurements were repeated five times for each polysaccharide solution.

The extensional viscosity $\eta_E$ of the polysaccharide solution could be calculated using formula (1) derived by McKinley and Tripathi from the contraction behavior of the filament after the upper plate reaches the final gap.

[Expression 4]

$$\eta_E = (2X - 1)\frac{\sigma}{\frac{-dD_{mid}(t)}{dt}} \quad (1)$$

Here, σ represents the surface tension of the polysaccharide solution, $D_{mid}^{(t)}$ represents the diameter of the filament at time t, and X represents a geometric coefficient that takes into account the shape of the filament during contraction due to inertial and gravitational effects. It has been experimentally shown that X=0.7127 is an appropriate value for highly viscous fluids.

A differential approximation of the diameter of the filament midpoint was calculated from formula (2).

[Expression 5]

$$\frac{dD_{mid}(t)}{dt} = \frac{D_{mid}(t_i) - D_{mid}(t_{i-1})}{t_i - t_{i-1}} \quad (2)$$

Here, $t_i$ represents a measurement point (time) closest to any time t, and $t_{i-1}$ represents a measurement point one before $t_i$. $D_{mid}$ ($t_i$) and $D_{mid}$ ($t_{i-1}$) represents filament diameters at the respective measurement points.

The extensional strain ε (Hencky strain) was calculated from formula (3).

[Expression 6]

$$\varepsilon = 2\ln\left(\frac{D_0}{D_{mid}(t)}\right) \quad (3)$$

The surface tension of each polysaccharide solution was measured at 25° C. using a high-performance surface tension measuring device DY-500 (Kyowa Interface Science Co., Ltd., Saitama, Japan). The measurements were repeated three times, and the average was taken as the surface tension σ of each polysaccharide solution.

(Coefficient of Friction Measurement)

Figure 1B:
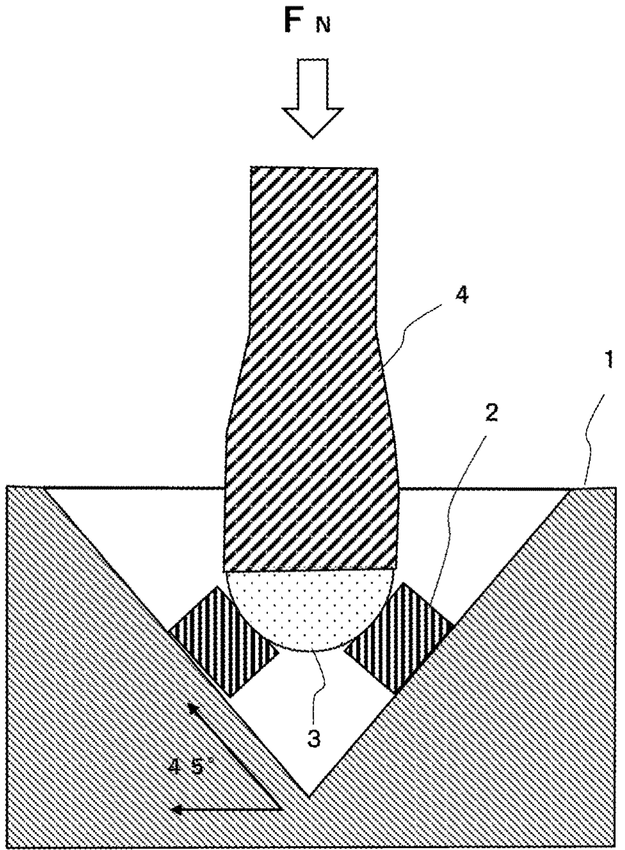
FIG. 1B is a front cross-sectional view schematically showing a tribology measuring equipment (set-up) used in Examples.

A Modular compact rheometer MCR302 (Anton Paar GmbH, Graz, Austria) with a tribology measuring equipment (set-up) was used to measure the coefficient of friction. As shown in FIGS. 1A to 1B, this equipment has a floor surface in which three cylindrical polydimethylsiloxane (PDMS) pins 2 having a diameter of 6 mm are arranged in an inverted conical container 1 with a top angle of 90° and a diameter of 20 mm (only two pins 2 are visible in FIG. 1B, but another pin 2 is actually present in the back). In this conical container 1, 1 ml of a polysaccharide solution was set, a plunger 4 equipped with a spherical ground glass 3 having a diameter of 12.7 mm was vertically pressed against the PDMS pins 2 from above. A normal load ($F_N$) of 0.3 N was applied, and then the plunger 4 was rotated with a shaft thereof as a rotation axis. The coefficient of friction was measured three times at a temperature of 25° C. with rotation at a sliding speed of $10^{-7}$ to 1 m/s, and the third measurement was adopted.

(Sensory Evaluation)

Twelve healthy dentate subjects (8 males, 4 females, mean age 32.3±5.4 years) were enrolled in this study. First, 10 ml of the polysaccharide solution was poured into the floor of the oral cavity of each subject in a randomized order using a 20 ml syringe (Terumo Corporation, Tokyo, Japan)

and swallowed whole at once without chewing. The subjects were asked to answer the viscosity order of the XG and LBG solutions to confirm that all subjects showed correct answers. Through this trial, it was confirmed that all the subjects had a certain degree of accuracy in the oral sensation, and that all the samples had distinguishable physical property differences in viscosity.

Next, the subjects were asked to evaluate subjective textures of "cohesiveness", "spinnability", and "sliminess" when they swallowed the polysaccharide solution in the same manner as described above. A visual analog scale (VAS) method was adopted as an evaluation method. Each subject was given a sheet on which a 100-mm long line segment was drawn, with the left end defined as the minimum and the right end as the maximum sensory evaluation value and was asked to mark a place on the line segment corresponding to the evaluation of each polysaccharide solution. The distance from the left end was measured in units of 1 mm, and this distance was defined as the texture evaluation value (VAS value, dimensionless) of each sample.

In this test, a bolus that flows as a lump when it passes through the throat was evaluated as having high cohesiveness, a bolus with a residual sensation in the oral cavity and throat as having high spinnability, and a bolus with a slippery sensation in the oral cavity and throat as having high sliminess. The number of sensory evaluation trials for one sample for each subject was set as one. Note that the texture upon swallowing is preferably large "cohesiveness", small "spinnability", and small "sliminess".

(Result of Shear Viscosity and Extensional Viscosity)

Table 1 shows the shear viscosity of each polysaccharide solution at a shear rate of 50 $s^{-1}$, the maximum extensional viscosity at an extensional strain of 2 to 4, and the extensional viscosity at an extensional viscosity of 8.

TABLE 1

| polysaccharide solution | Concentration (%) | shear viscosity (50 $s^{-1}$) | maximum extensional viscosity at an extensional strain of 2 to 4 (mPa · s) | extensional viscosity at an extensional viscosity of 8 (mPa · s) |
|---|---|---|---|---|
| X-1 | 0.2 | 54 | 2,385 | 1,864 |
| X-2 | 0.4 | 102 | 2,624 | 1,935 |
| X-3 | 0.6 | 139 | 3,258 | 1,714 |
| X-4 | 0.8 | 168 | 4,604 | 1,970 |
| X-5 | 1.0 | 242 | 5,231 | 2,231 |
| L-1 | 0.3 | 56 | 319 | 2,120 |
| L-2 | 0.4 | 98 | 528 | 1,947 |
| L-3 | 0.45 | 132 | 743 | 2,377 |
| L-4 | 0.5 | 182 | 1,423 | 2,338 |
| L-5 | 0.55 | 229 | 1,846 | 2,554 |

The shear viscosity of both XG and LBG increased as the concentration increased. The steady flow viscosities of five pairs of beverage samples, X-1 and L-1, X-2 and L-2, X-3 and L-3, X-4 and L-4, and X-5 and L-5, of the polysaccharide solutions used in this study were in similar levels.

FIG. 2 shows the extensional strain (Hencky strain) dependence of the extensional viscosity. FIG. 2(*a*) shows results of the XG solution with xanthan gum, and FIG. 2(*b*) shows results of the LBG solution with locust bean gum. As shown in FIG. 2, all polysaccharide solutions showed a positive peak between extensional strains of 2 to 4, followed by a decrease in viscosity, and a bottom of the decrease in viscosity between extensional strains of 4 to 6, then the extensional viscosity increased with increasing extensional strain until the filament broke. The maximum extensional viscosities at the extensional strains of 2 to 4 increased in a concentration-dependent manner in the XG and LBG solutions, but when comparing solutions with similar shear viscosities, the XG solution tended to have a higher extensional viscosity. The extensional viscosity at the extensional strain of 8 increased in a concentration-dependent manner, but when comparing solutions with similar shear viscosities, the LBG solution tended to have a higher extensional viscosity.

(Result of Coefficient of Friction)

Figure 3:
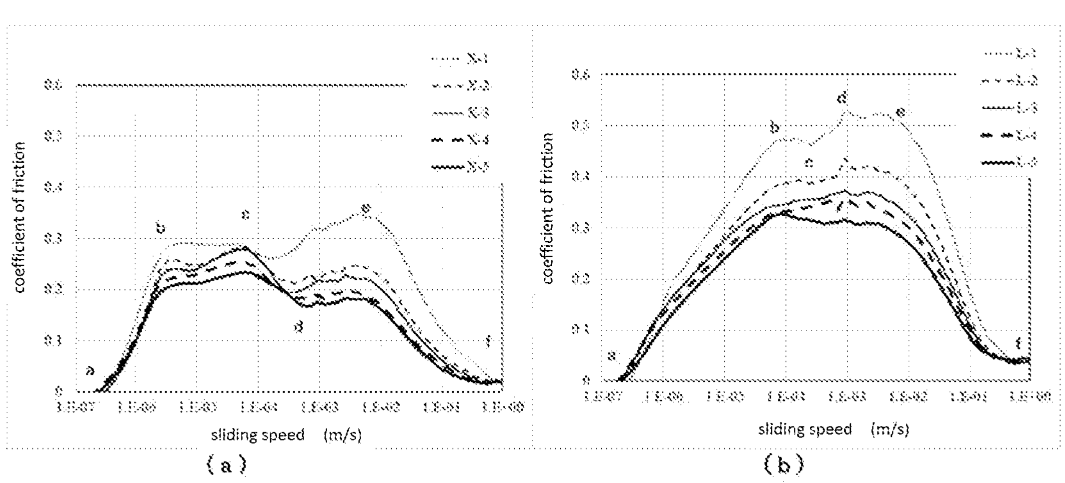
FIG. 3 is a graph showing sliding velocity dependence of a coefficient of friction in Example 1.

FIG. 3 shows the sliding speed dependence of the coefficient of friction of the XG and LBG solutions. FIG. 3(*a*) shows results of the XG solution with xanthan gum, and FIG. 3(*b*) shows results of the LBG solution with locust bean gum. This graph, called the Stribeck curve, shows the interaction of PDMS as a flooring material, a ground glass ball as the plunger, and the polysaccharide solution.

In this graph, symbols a to f are added for explanation. The coefficient of friction of all concentrations of the XG solutions showed a tendency to increase sharply from sliding speed of $1\times10^{-7}$ to about $4\times10^{-6}$ m/s (a-b region) then up to about $6\times10^{-5}$ m/s (b-c region) with a small increase and decrease, then decrease to about $5\times10^{-4}$ m/s (c-d region), increase to $6\times10^{-3}$ m/s (d-e region), and then decrease sharply up to 1 m/s (e-f region).

On the other hand, the coefficient of friction of the LBG solutions showed a tendency to increase more slowly than that of the XG solutions from sliding speed of $1\times10^{-7}$ to about $6\times10^{-5}$ m/s (a-b region) up to about $3\times10^{-4}$ m/s (b-c region) with a small increase and decrease, then increase to about $1\times10^{-3}$ m/s (c-d region) up to $6\times10^{-3}$ m/s (d-e region) with a small increase and decrease, and then decrease sharply up to 1 m/s (e-f region).

As in the case of the XG solution, the coefficient of friction decreased as the LBG concentration increased in almost the entire shear-rate range. Table 2 shows the coefficient of friction at the point (b-e) where the region changes in the figure. At all shear rates from b-e, the coefficient of friction decreased as the concentrations of the XG and LBG increased.

TABLE 2

| polysaccharide solution | Concentration (%) | coefficient of friction b | c | d | e |
|---|---|---|---|---|---|
| X-1 | 0.2 | 0.289 | 0.283 | 0.296 | 0.342 |
| X-2 | 0.4 | 0.258 | 0.282 | 0.218 | 0.242 |
| X-3 | 0.6 | 0.240 | 0.278 | 0.200 | 0.221 |
| X-4 | 0.8 | 0.223 | 0.252 | 0.183 | 0.188 |
| X-5 | 1.0 | 0.210 | 0.234 | 0.168 | 0.182 |
| L-1 | 0.3 | 0.286 | 0.457 | 0.495 | 0.503 |
| L-2 | 0.4 | 0.284 | 0.411 | 0.434 | 0.416 |
| L-3 | 0.45 | 0.204 | 0.340 | 0.348 | 0.340 |
| L-4 | 0.5 | 0.202 | 0.282 | 0.301 | 0.310 |
| L-5 | 0.55 | 0.179 | 0.258 | 0.280 | 0.279 |

(Result of Sensory Evaluation)

Table 3 shows the sensory evaluation values for each of the texture of "cohesiveness", "spinnability", and "sliminess" when 12 subjects were asked to swallow the polysaccharide solution.

TABLE 3

| polysaccharide solution | Concentration (%) | cohesiveness | spinnability | sliminess |
|---|---|---|---|---|
| X-1 | 0.2 | 28.9 | 26.1 | 15.0 |
| X-2 | 0.4 | 42.5 | 30.8 | 38.6 |
| X-3 | 0.6 | 55.8 | 37.0 | 44.4 |
| X-4 | 0.8 | 65.5 | 43.6 | 58.1 |
| X-5 | 1.0 | 69.6 | 46.4 | 59.8 |
| L-1 | 0.3 | 17.1 | 42.4 | 13.6 |
| L-2 | 0.4 | 23.6 | 53.9 | 23.0 |
| L-3 | 0.45 | 29.0 | 64.8 | 35.8 |
| L-4 | 0.5 | 26.0 | 75.6 | 39.1 |
| L-5 | 0.55 | 23.0 | 83.3 | 38.3 |

The "cohesiveness" of the XG solution was generally higher than that of the LBG. In addition, the "cohesiveness" of the XG solution tended to increase as the concentration increased. On the other hand, "cohesiveness" of the LBG solution was generally lower than that of XG, and no definite tendency was observed. The "spinnability" of the XG and LBG solutions tended to increase in a concentration-dependent manner, but the LBG solution showed higher values than the XG solution at all concentrations. Both the "sliminess" of the XG and LBG solutions also tended to increase in a concentration-dependent manner, but the rate of increase decreased as the concentration increased.

(Correlation Between Sensory Evaluation and Extensional Rheology)

Figure 4:
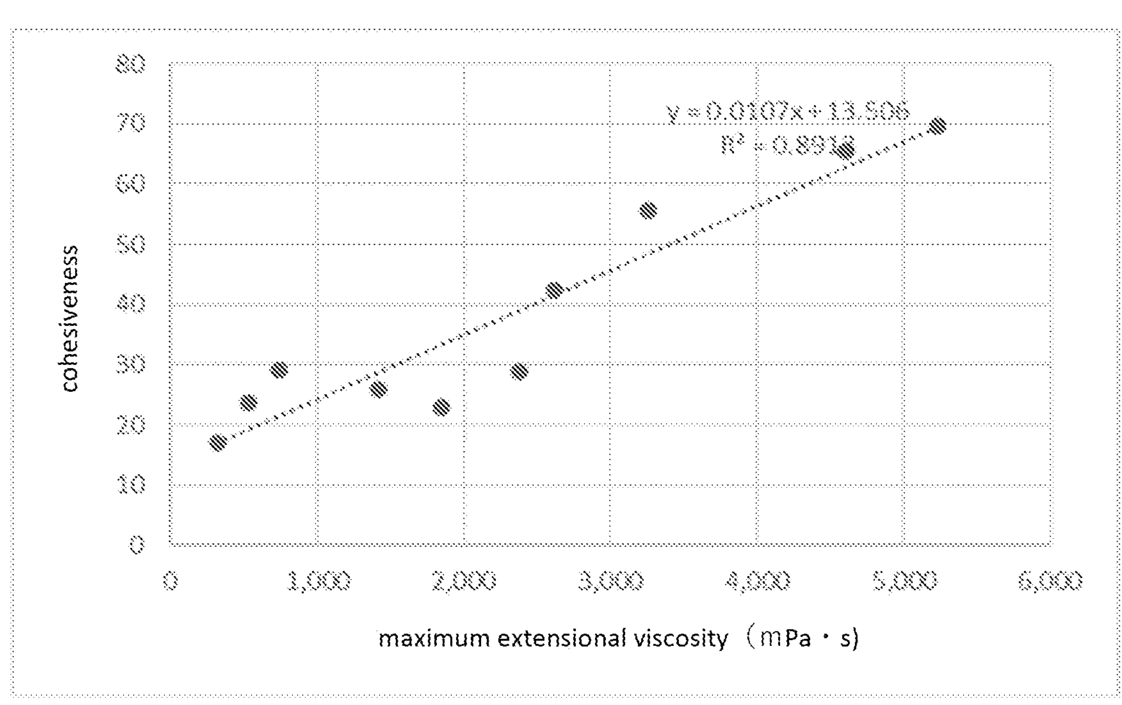
FIG. 4 is a scatterplot showing a correlation between the maximum extensional viscosity at an extensional strain of 2 to 4 and a sensory evaluation value of "cohesiveness" in Example 1.

FIG. 4 is a scatterplot showing the correlation between the maximum extensional viscosity and the sensory evaluation value of "cohesiveness" at extensional strains of 2 to 4 for each polysaccharide solution in the extensional viscosity measurement using CaBER1. As a result of determining the correlation between the two, the correlation coefficient was $r=0.944$ ($p<0.05$), which was very high. In the extensional viscosity measurement using CaBER1, there is a region where the filament contraction speed decreases after forced displacement by the plunger, and this is observed as an increase in extensional viscosity at the extensional strains of 2 to 4. During swallowing, the tongue moves the solution into the pharynx, which forces the solution to displace. It is expected that the decrease in fluidity at this time, that is, the increase in the extensional viscosity, is perceived by the subjects as the "cohesiveness" of the solution.

In addition, the viscosity of the LBG solution, which was generally evaluated as having high "spinnability" in the sensory evaluation, in the high extensional strain (8 or more) region tended to be higher than that of the XG solution. Table 4 shows the correlation between the extensional viscosity values of the total polysaccharide solution at extensional strains of 3 to 9 and the sensory evaluation values of "spinnability".

TABLE 4

| | extensional strain 3 | 4 | 5 | 6 | 7 | 8 | 9 |
|---|---|---|---|---|---|---|---|
| correlation coefficient with "spinnability" | −0.010 | 0.190 | 0.199 | 0.151 | 0.467 | 0.860 | 0.805 |

Figure 5:
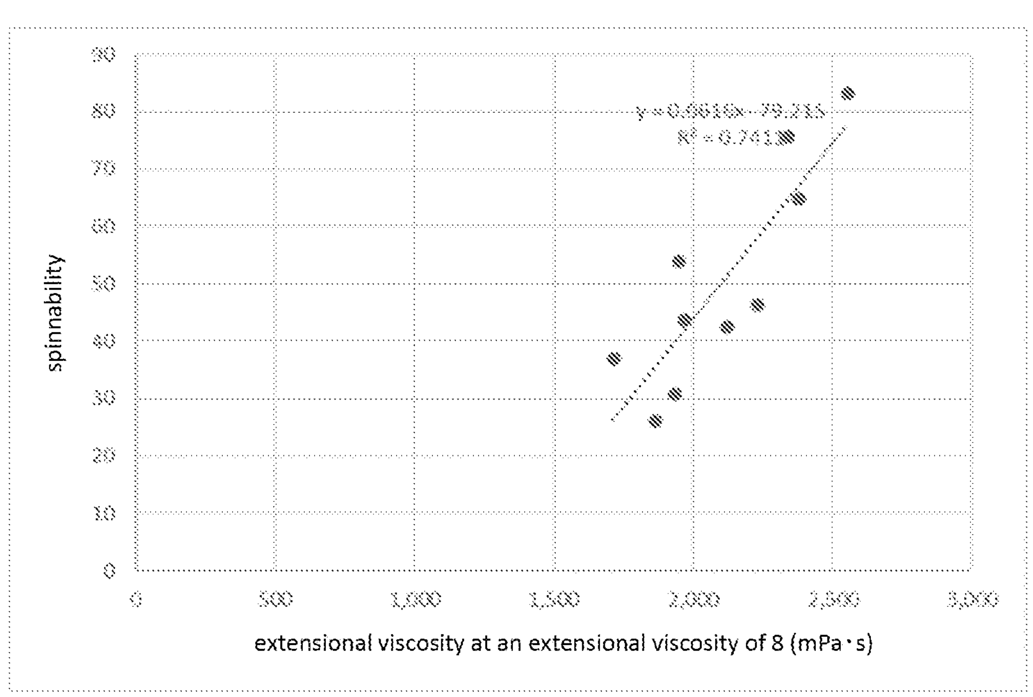
FIG. 5 is a scatterplot showing a correlation between an extensional viscosity at an extensional strain of 8 and a sensory evaluation value of "spinnability" in Example 1.

It was confirmed that "spinnability" had a high correlation with the extensional viscosity in the high strain region, and in particular, the correlation coefficient at an extensional strain of 8 was the highest at $r=0.860$ ($p<0.05$). FIG. 5 is a scatterplot showing the correlation between the extensional viscosity at the extensional strain of 8 and the sensory evaluation value of "spinnability".

From the above results, it was confirmed that the filament diameter of the liquid could be measured over time at 25° C. using a capillary breakup extensional viscometer, the extensional viscosity and the extensional strain were calculated from the rate of change in the diameter, the maximum extensional viscosity at the extensional strain of 2 to 4 was obtained to use this as an indicator of "cohesiveness", and the extensional viscosity at any point with an extensional viscosity of 7 or more was obtained to use this as an indicator of "spinnability".

(Correlation Between Sensory Evaluation and Tribology)

Table 5 shows the correlation between the coefficient of friction and the "sliminess" at points b to e in FIG. 3.

TABLE 5

| | The point where the region changes on the Stribeck curve in FIG. 2 b | c | d | e |
|---|---|---|---|---|
| correlation coefficient with "sliminess" | −0.685 | −0.738 | −0.829 | −0.895 |

Figure 6:
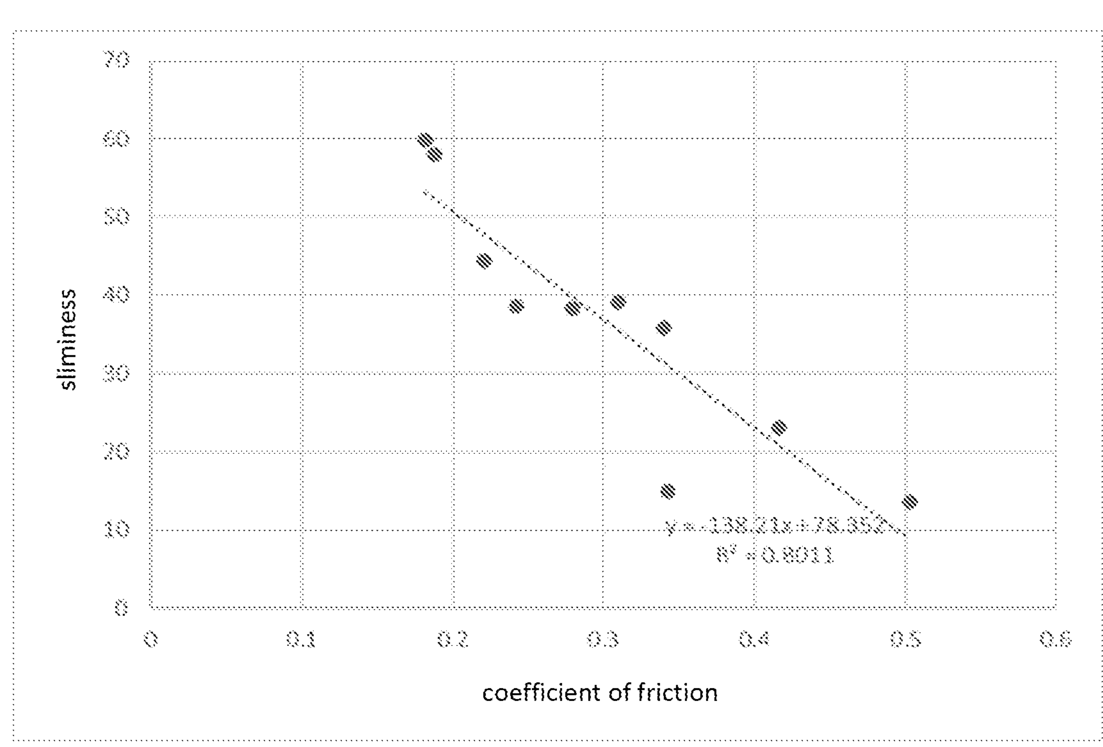
FIG. 6 is a scatterplot showing a correlation between a coefficient of friction at point e (i.e., sliding speed of 0.006 m/s) and a sensory evaluation value of "sliminess" in Example 1.

A high negative correlation was observed between the "sliminess" and the coefficient of friction at any point, but in particular the correlation coefficient at point e (i.e., 0.006 m/s), the transition point from a "boundary lubrication region" to a "mixed lubrication region", showed the highest value of $r=-0.895$ ($p<0.05$). FIG. 6 is a scatterplot showing the correlation between the coefficient of friction at point e (i.e., 0.006 m/s) and the sensory evaluation value of "sliminess".

It is considered that humans sensuously perceive a lubricating effect by as follows: a certain amount of polysaccharide solution entering between the tongue and the palate to form a film and reduce the roughness of the surface of the living tissue as "sliminess". In other words, it was confirmed that "sliminess" had a high correlation with the coefficient of friction at the point of transition from the "boundary lubrication region" to the "mixed lubrication region", and that the texture of the polysaccharide solution and liquid food containing it could be evaluated using this as an indicator.

Examples 2: Evaluation of Texture Upon Swallowing Commercially Available Thickener for Toromi-Optimized Foods Solution (Preparation of Commercially Available Granular Thickener Formulation Solution)

Five major types of thickener for toromi-optimized foods currently on the market (a to e, all of which are granular products containing xanthan gum as the main component for thickening and intended mainly for people having difficulty in swallowing) were used to obtain a thickener for toromi-optimized foods having the weight shown in Table 6 by adding it to 100 g of ion-exchanged water under stirring by hand at a speed of 4 revolutions per second, and then the mixture was stirred at the same stirring speed for 30 seconds to prepare a thickener for toromi-optimized foods solution without the formation of lumps.

TABLE 6

| thickner for toromi-optimized foods solution | thickner for toromi-optimized foods | Concentration (%) |
|---|---|---|
| a-1 | thickner for | 0.99 |
| a-2 | toromi-optimized | 1.84 |
| a-3 | foods a | 3.77 |
| b-1 | thickner for | 1.10 |
| b-2 | toromi-optimized | 1.80 |
| b-3 | foods b | 3.00 |
| c-1 | thickner for | 0.94 |
| c-2 | toromi-optimized | 1.60 |
| c-3 | foods c | 2.80 |
| d-1 | thickner for | 1.10 |
| d-2 | toromi-optimized | 1.82 |
| d-3 | foods d | 2.90 |
| e-1 | thickner for | 0.90 |
| e-2 | toromi-optimized | 1.65 |
| e-3 | foods e | 3.20 |

(Sensory Evaluation, Measurement of Shear Viscosity, Extensional Viscosity, and Coefficient of Friction)

Each of the thickener for toromi-optimized foods solutions was allowed to stand in a constant temperature bath at 25° C., and after 30 minutes, the shear viscosity, extensional viscosity, and coefficient of friction were measured in the same manner as in Example 1. The sensory evaluation of each thickener for toromi-optimized foods solution was performed in the same manner as in Example 1, and the results (VAS values) were shown in Table 7 together with the shear viscosity.

TABLE 7

| thickner for toromi-optimized foods solution | shear viscosity of 50 $s^{-1}$ (mPa · s) | cohesiveness | spinnability | sliminess |
|---|---|---|---|---|
| a-1 | 99.1 | 38.5 | 55.5 | 25.0 |
| b-1 | 101.3 | 27.1 | 42.1 | 38.2 |
| c-1 | 97.5 | 24.6 | 38.2 | 45.8 |
| d-1 | 101.5 | 30.2 | 25.5 | 38.7 |
| e-1 | 99.4 | 28.5 | 81.9 | 85.6 |
| a-2 | 202.4 | 58.8 | 85.2 | 44.6 |
| b-2 | 195.7 | 35.5 | 45.7 | 75.6 |
| c-2 | 204.7 | 40.2 | 40.5 | 32.1 |
| d-2 | 202.1 | 45.6 | 32.8 | 41.5 |
| e-2 | 199.1 | 65.1 | 98.6 | 62.5 |
| a-3 | 401.3 | 45.2 | 92.1 | 41.2 |
| b-3 | 410.8 | 32.6 | 48.5 | 82.2 |
| c-3 | 396.5 | 69.8 | 55.8 | 58.7 |
| d-3 | 401.1 | 71.2 | 71.2 | 48.5 |
| e-3 | 396.3 | 75.6 | 99.2 | 95.5 |

The shear viscosities at 50 $s^{-1}$ of the thickener for toromi-optimized foods solutions a-1 to e-1 were all about 100 mPa·s. Based on the sensory evaluation VAS value of 50, a higher "cohesiveness" (i.e., 50 or more) is preferred, and the lower "spinnability" and "sliminess" (i.e., less than 50) provide better texture. For example, a-1 was evaluated as having good "sliminess" but not being good in "cohesiveness" or "spinnability". In Table 7, the sensory evaluation values of the samples with good texture are shown in bold.

In addition, the shear viscosity at a sliding speed of 50 $s^{-1}$, the maximum extensional viscosity at an extensional strain of 2 to 4, the extensional viscosity at an extensional strain of 8, the coefficient of friction at a sliding speed of 0.006 m/s, and the characteristics of texture of each solution are described in Table 8.

TABLE 8

| thickner for toromi-optimized foods solution | shear viscosity of 50 $s^{-1}$ (mPa · s) | maximum extensional viscosity at an extensional strain of 2 to 4 (mPa · s) | extensional viscosity at an extensional viscosity of 8 (mPa · s) | coefficient of friction at a sliding speed of 0.006 m/s |
|---|---|---|---|---|
| a-1 | 99.1 | 1,904 | 2,426 | 0.384 ○ |
| b-1 | 101.3 | 1,118 | 864 ○ | 0.311 ○ |
| c-1 | 97.5 | 1,387 | 338 ○ | 0.307 ○ |
| d-1 | 101.5 | 1,723 | 850 ○ | 0.315 ○ |
| e-1 | 99.4 | 1,536 | 4,123 | 0.124 |
| a-2 | 202.4 | 5,667 ○ | 4,814 | 0.307 ○ |
| b-2 | 195.7 | 3,825 | 966 ○ | 0.194 |
| c-2 | 204.7 | 1,498 | 1,097 ○ | 0.241 ○ |
| d-2 | 202.1 | 4,691 | 1,820 ○ | 0.242 ○ |
| e-2 | 199.1 | 6,990 ○ | 12,411 | 0.303 |
| a-3 | 401.3 | 5,261 | 7,916 | 0.191 ○ |
| b-3 | 410.8 | 7,854 | 1,091 ○ | 0.156 |
| c-3 | 396.5 | 43,906 ○ | 3,486 | 0.180 |
| d-3 | 401.1 | 19,278 ○ | 3,962 | 0.193 ○ |
| e-3 | 396.3 | 140,793 ○ | —* | 0.090 |

*Viscosity was too high to measure

Here, when the thickener for toromi-optimized foods solution at 25° C. was in the following conditions, the respective measured values in Table 8 were listed in bold:

Dispersions (a-1 to e-1) with shear viscosity adjusted to 50 to 150 mPa·s at a shear rate of 50 $s^{-1}$ had a maximum extensional viscosity of 2,000 mPa·s or more in a region where the extensional strain is 2 to 4, an extensional viscosity of 2,000 mPa·s or less at an extensional strain of 8, and a coefficient of friction of 0.22 or more at a sliding speed of 0.006 m/s;

Dispersions (a-2 to e-2) with shear viscosity adjusted to 150 to 300 mPa·s had a maximum extensional viscosity of 5,000 mPa·s or more in a region where the extensional strain is 2 to 4, an extensional viscosity of 2,500 mPa·s or less at an extensional strain of 8, and a coefficient of friction of 0.20 or more at a sliding speed of 0.006 m/s; and Dispersions (a-3 to e-3) with shear viscosity adjusted to 300 to 500 mPa·s had a maximum extensional viscosity of 8,000 mPa·s or more in a region where the extensional strain is 2 to 4, an extensional viscosity of 3,000 mPa·s or less at an extensional strain of 8, and a coefficient of friction of 0.18 or more at a sliding speed of 0.006 m/s. Further, in the sensory evaluation (Table 7), O was added to the right of the measured value of "maximum extensional viscosity at extensional strain of 2 to 4" when the "cohesiveness" was judged to be good, O was added to the right of the measured value of "extensional viscosity at extensional strain of 8" when the "spinnability" was judged to be good, and O was added to the right of the measured value of "coefficient of friction at sliding speed of 0.006 m/s" when the "sliminess" was judged to be good. The bolded values and the items marked with circles were completely consistent with each other, and it was confirmed that the quality of the texture of food or drink high-speed pulverizer (Wonder Blender WB-1, manufactured by Osaka Chemical Co., Ltd.) to collect and a pulverized product (150 to 250 μm) of 60 mesh pass and 100 mesh on.

<Thermally Modified Xanthan Gum (with Metaphosphoric Acid)>

Xanthan gum (SAN SUPPORT® P-180, San-Ei Gen F.F.I., Inc., Osaka, Japan) was fed into a hopper of a twin screw extruder at a feed rate of 10 g/min. Further, extruder treatment was performed while water (20° C.) containing 5% by mass of sodium hexametaphosphate was added at a rate of 20 g/min.

The same extruder equipment (barrel, screw diameter, and discharge nozzle shape), temperature setting of each barrel, rotational speed of the screw, kneading time, drying, sieving, and collecting steps were used as for the thermally modified xanthan gum.

TABLE 9

| thickner for toromi-optimized foods solution | thickner for toromi-optimized foods | Concentration (%) | Additive | Concentration (%) |
|---|---|---|---|---|
| A-1 | thickner for | 0.48 | thermally | 0.45 |
| A-2 | toromi-optimized | 0.95 | modified | 0.60 |
| A-3 | foods a | 1.90 | xanthan gum | 1.13 |
| E-1 | thickner for | 0.40 | thermally | 0.25 |
| E-2 | toromi-optimized | 0.80 | modified | 0.30 |
| E-3 | foods e | 1.60 | xanthan gum (with metaphosphoric acid) | 0.45 |

could be clearly estimated through the extensional viscosity or friction parameters defined for the food or drink adjusted to each shear viscosity range.

Example 3: Preparation of Formulation for Improving Swallowing Texture

Thermally modified xanthan gum was added to the same thickener for toromi-optimized foods a or e as in Example 2 in an amount listed in Table 9 and was added to 100 g of ion-exchanged water under stirring by hand at a speed of 4 revolutions per second, and then the mixture was stirred at the same stirring speed for 30 seconds to prepare thickener for toromi-optimized foods solutions A-1 to A-3 without the formation of lumps. The shear viscosity of the thickener for toromi-optimized foods solution A-1 at a sliding speed of 50 $s^{-1}$ was 100.5 mPa·s (target value: 94 to 106 mPa·s). Note that the preparation methods of heat-treated xanthan gum and thermally modified xanthan gum (with metaphosphoric acid) are described below.

<Thermally Modified Xanthan Gum>

Xanthan gum (SAN SUPPORT® P-180, San-Ei Gen F.F.I., Inc., Osaka, Japan) was fed into a hopper of a twin screw extruder at a feed rate of 10 g/min. Further, extruder treatment was performed while ion-exchanged water (20° C.) was added at a rate of 20 g/min.

The extruder used had eight barrels (including a discharge port), a screw diameter of 11 mm, and a circular discharge nozzle shape with a hole size of 2.0 mm. The temperature setting of each barrel was 70° C. for the barrel near the hopper and 90° C. for the barrel on the discharge nozzle side including a kneading section. The rotational speed of the screw was adjusted to 150 rpm, and the kneading time was 60 seconds. The resulting heated melt-kneaded material was collected from the discharge nozzle and dried at 60° C. for 20 hours. After drying, the material was crushed with a small The thickener for toromi-optimized foods solutions A-1 to E-3 were allowed to stand in a constant temperature bath at 25° C., and after 30 minutes, the shear viscosity, extensional viscosity, and coefficient of friction were measured in the same manner as in Example 1. The results are summarized in Table 10. As in Table 8, the respective measured values in Table 10 were listed in bold in the following cases:

Dispersions (A-1 and E-1) with shear viscosity adjusted to 50 to 150 mPa·s had a maximum extensional viscosity of 2,000 mPa·s or more in a region where the extensional strain is 2 to 4, an extensional viscosity of 2,000 mPa·s or less at an extensional strain of 8, and a coefficient of friction of 0.22 or more at a sliding speed of 0.006 m/s;

Dispersions (A-2 and E-2) with shear viscosity adjusted to 150 to 300 mPa·s had a maximum extensional viscosity of 5,000 mPa·s or more in a region where the extensional strain is 2 to 4, an extensional viscosity of 2,500 mPa·s or less at an extensional strain of 8, and a coefficient of friction of 0.20 or more at a sliding speed of 0.006 m/s; and Dispersions (A-3 and E-3) with shear viscosity adjusted to 300 to 500 mPa·s had a maximum extensional viscosity of 8,000 mPa·s or more in a region where the extensional strain is 2 to 4, an extensional viscosity of 3,000 mPa·s or less at an extensional strain of 8, and a coefficient of friction of 0.18 or more at a sliding speed of 0.006 m/s.

Regarding the sensory evaluation values evaluated by the same manner as in Examples, O was added to the right of the measured value of "maximum extensional viscosity at extensional strain of 2 to 4" when the "cohesiveness" was judged to be good (VAS value of 50 or more), O was added to the right of the measured value of "extensional viscosity at extensional strain of 8" when the "spinnability" was judged to be good (VAS value of less than 50), and O was added to the right of the measured value of "coefficient of friction at sliding speed of 0.006 m/s" when the "sliminess" was judged to be good (VAS value of less than 50).

TABLE 10

| thickner for toromi-optimized foods solution | shear viscosity of 50 $s^{-1}$ (mPa · s) | maximum extensional viscosity at an extensional strain of 2 to 4 (mPa · s) | | extensional viscosity at an extensional viscosity of 8 (mPa · s) | | coefficient of friction at a sliding speed of 0.006 m/s | |
|---|---|---|---|---|---|---|---|
| A-1 | 103.3 | 2,585 | ○ | 1,836 | ○ | 0.379 | ○ |
| A-2 | 195.1 | 6,252 | ○ | 2,265 | ○ | 0.283 | ○ |
| A-3 | 406.3 | 9,504 | ○ | 2,571 | ○ | 0.258 | ○ |
| E-1 | 102.4 | 3,763 | ○ | 1,733 | ○ | 0.355 | ○ |
| E-2 | 206.2 | 7,525 | ○ | 2,142 | ○ | 0.272 | ○ |
| E-3 | 385.3 | 11,831 | ○ | 2,840 | ○ | 0.223 | ○ |

The respective values of the maximum extensional viscosity in the region where the extensional strain was 2 to 4, the extensional viscosity at the extensional strain of 8, and the coefficient of friction at the sliding speed of 0.006 m/s of all the thickener for toromi-optimized foods solutions (A-1 to E-3) adjusted in Example 3 were all within the ranges described above, and the texture of all the thickener for toromi-optimized foods solutions were also excellent with good cohesion, little spinnability (residual sensation) to entangle in the throat, and little unpleasant sliminess in the oral cavity.

What is claimed is:

1. A formulation for improving a swallowing texture comprising a thickening polysaccharide, wherein a dispersion of the formulation in ion-exchanged water, the dispersion having a shear viscosity of 50 to 150 mPa·s at a shear rate of 50 $s^{-1}$ at 25° C., (i) exhibits a maximum extensional viscosity of 2,000 mPa·s or more in a region where an extensional strain is 2 to 4, as measured by a capillary breakup extensional viscometer, (ii) exhibits an extensional viscosity of 2,000 mPa·s or less at an extensional strain of 8, as measured by the capillary breakup extensional viscometer, and (ii) exhibits a coefficient of friction of 0.22 or more at a sliding speed of 0.006 m/s, as determined by a tribological test in which a rotating body is rotated while a pressing force is applied with the dispersion interposed between the rotating body and a receiving portion.

2. A formulation for improving a swallowing texture comprising a thickening polysaccharide, wherein a dispersion of the formulation in ion-exchanged water, the dispersion having a shear viscosity of 150 to 300 mPa·s at a shear rate of 50 $s^{-1}$ at 25° C., (i) exhibits a maximum extensional viscosity of 5,000 mPa·s or more in a region where an extensional strain is 2 to 4, as measured by a capillary breakup extensional viscometer, (ii) exhibits an extensional viscosity of 2.500 mPa·s or less at an extensional strain of 8, as measured by the capillary breakup extensional viscometer, and (iii) exhibits a coefficient of friction of 0.20 or more at a sliding speed of 0.006 m/s, as determined by a tribological test in which a rotating body is rotated while a pressing force is applied with the dispersion interposed between the rotating body and a receiving portion.

3. A formulation for improving a swallowing texture comprising a thickening polysaccharide, wherein a dispersion of the formulation in ion-exchanged water, the dispersion having a shear viscosity of 300 to 500 mPa·s at a shear rate of 50 $s^{-1}$ at 25° C., (i) exhibits a maximum extensional viscosity of 8,000 mPa·s or more in a region where an extensional strain is 2 to 4, as measured by a capillary breakup extensional viscometer, (ii) exhibits an extensional viscosity of 3,000 mPa·ss or less at an extensional strain of 8, as measured by the capillary breakup extensional viscometer, and (iii) exhibits a coefficient of friction of 0.18 or more at a sliding speed of 0.006 m/s, as determined by a tribological test in which a rotating body is rotated while a pressing force is applied with the dispersion interposed between the rotating body and a receiving portion.

* * * * *